United States Patent [19]

El-Antably et al.

[11] Patent Number: 5,693,250
[45] Date of Patent: Dec. 2, 1997

[54] GRAIN ORIENTED COMPOSITE SOFT MAGNETIC STRUCTURE

[75] Inventors: Ahmed Mostafa El-Antably, Indianapolis; Robert Walter Ward, Anderson, both of Ind.

[73] Assignee: General Motors Corporation, Detroit, Mich.

[21] Appl. No.: 153,853

[22] Filed: Nov. 18, 1993

Related U.S. Application Data

[63] Continuation-in-part of Ser. No. 48,913, Apr. 20, 1993, Pat. No. 5,296,773.
[51] Int. Cl.$^6$ .................................................. C04B 35/04
[52] U.S. Cl. .......................... 252/62.54; 148/306
[58] Field of Search ........................ 252/62.54, 62.55; 148/306

[56] References Cited

U.S. PATENT DOCUMENTS

| | | | |
|---|---|---|---|
| 3,671,789 | 6/1972 | Menzies | 310/163 |
| 3,679,924 | 7/1972 | Menzies | 310/163 |
| 3,686,553 | 8/1972 | Broadway et al. | 318/199 |
| 3,980,933 | 9/1976 | Piatkowski, Jr. | 318/138 |
| 4,110,646 | 8/1978 | Rao | 310/163 |
| 4,289,989 | 9/1981 | Schibline | 310/261 |
| 4,459,502 | 7/1984 | El-Antably | 310/184 |
| 4,510,680 | 4/1985 | Miller | 310/42 |
| 4,614,888 | 9/1986 | Mosher | 310/261 |
| 4,628,245 | 12/1986 | Quayle | 322/32 |
| 4,678,954 | 7/1987 | Takada et al. | 310/156 |
| 4,742,258 | 5/1988 | Earle et al. | 310/156 |
| 4,888,513 | 12/1989 | Fratta | 310/216 |
| 4,893,042 | 1/1990 | Tanaka | 310/216 |
| 4,924,130 | 5/1990 | Fratta | 310/261 |
| 4,947,065 | 8/1990 | Ward | 310/44 |
| 4,977,344 | 12/1990 | Obradovic | 310/217 |
| 5,023,502 | 6/1991 | Johnson | 310/261 |
| 5,051,680 | 9/1991 | Belanger | 318/701 |
| 5,070,264 | 12/1991 | Conrad | 310/68 |
| 5,191,256 | 3/1993 | Reiter, Jr. | 310/216 |

FOREIGN PATENT DOCUMENTS 1114562  5/1968  United Kingdom .

OTHER PUBLICATIONS

Elements of Materials Science, Second Edition, Addison--Wesley Publishing Co., Inc. pp. 123–155 1964.

Primary Examiner—John Sheehan
Attorney, Agent, or Firm—Anthony Luke Simon

[57] ABSTRACT

A soft magnetic structure substantially comprised of a plurality of magnetic field carrying particles molded and retained in a predetermined shape, bonded in that shape by an insulating binding agent, wherein said particles have grain alignment substantially parallel to a preferred direction, and wherein said preferred direction is parallel to a direct axis providing the structure with a high direct axis to quadrature axis reactance ratio.

5 Claims, 4 Drawing Sheets

GRAIN ORIENTED COMPOSITE SOFT MAGNETIC STRUCTURE

This relates to improved soft magnetic structures of a type useful in dynamo-electric machines. This invention is a continuation-in-part of United States patent application Ser. No. 08/048,913, filed Apr. 20, 1993 now U.S. Pat. No. 5,296,773, assigned to the assignee of this invention and having a disclosure incorporated herein by reference.

BACKGROUND OF THE INVENTION

Axially laminated synchronous reluctance motors have been shown to be highly efficient with high power factor and power densities. Known techniques for producing rotors for such motors include using anisotropic grain oriented steel with multiple laminations made in segments and assembled to a rotor machine from fiberglass. Segments are interleaved with aluminum sheets to provide transient torque to damp any oscillation during transience and provide some mechanical integrity to the segments. This manufacturing technique is expensive and limits the use of high efficiency motor to special applications where cost is warranted.

As an alternative to the use of steel laminations for magnetic cores, it has been suggested that cores can be formed from iron powder. An article in *Powder Metallurgy*, Volume 25, No. 4 (1982), Pages 201–208, entitled "Properties and Applications of Soft Magnetic Powder Composites" authored by Kordecki, Weglinski and Kaczmar, discloses magnetic cores that are formed of ferromagnetic powder. This article discloses so-called magneto-dielectrics that are comprised of iron powder and a dielectric.

Prior art soft magnetic powder composite structures have exhibited direct axis to quadrature axis reactance ratios as high as 4, and some as high as 6.

United States patents describing the use of powdered iron structures in dynamoelectric machines include U.S. Pat. Nos. 4,947,065, 5,004,577 and 5,121,021.

SUMMARY OF THE PRESENT INVENTION

Advantageously, this invention provides a soft magnetic structure made from microencapsulated powder or iron particles having significantly increased flux capacity in a preferred direction and reduced flux capacity in a direction orthogonal to the preferred direction. Advantageously, this invention provides a soft magnetic structure with a very high ratio of direct axis to quadrature axis reactance, which greatly improves the flux carrying performance of the structure and increases its efficiency.

Advantageously, this invention provides a grain oriented composite iron process and structure. Advantageously, this invention provides a soft magnetic material comprising composite iron particles with magnetic pole alignment. Advantageously, this invention comprises a soft magnetic structure with an anisotropic grain oriented powdered iron. Advantageously, this invention provides a soft magnetic material useful for high efficiency motors (such as those useful in electric vehicles), high efficiency transformers, advanced power converters, power supplies etc.

Advantageously, this invention provides a process of constructing grain oriented soft magnetic materials comprising the steps of (a) coating particles of a ferrous powder with an insulating material, (b) placing the coated particles in a mold, (c) heating said mold, wherein at least a portion of the insulating material obtains a fluid state, (d) providing a magnetic field across said mold while the mold is heated and at least a portion of the insulating material is in a fluid state, wherein said magnetic field is in a preferred direction, (e) cooling the mold while maintaining the electric field, and (f) removing a resultant structure from the mold wherein said resultant structure comprises a soft magnetic structure having grain orientations corresponding to the preferred direction of the applied magnetic field and having a high direct axis to quadrature axis reactance ratio.

Various implementations of this invention are described in more detail below.

DETAILED DESCRIPTION OF THE INVENTION

Figure 1:
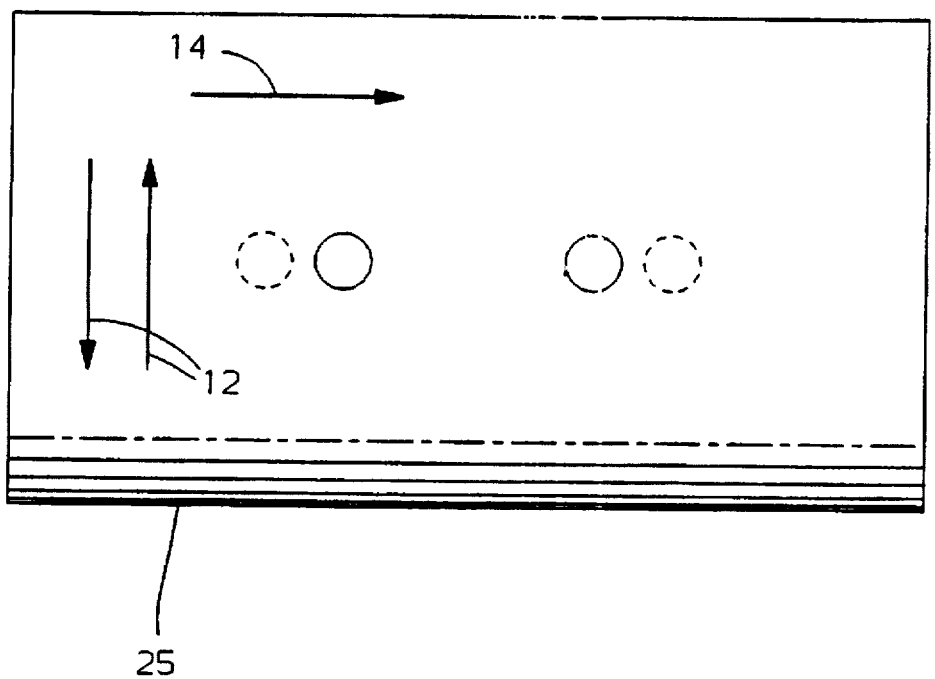
FIG. 1 illustrates a soft magnetic structure having grain orientation and a high ratio of direct axis to quadrature axis reactance according to this invention.
Figure 2:
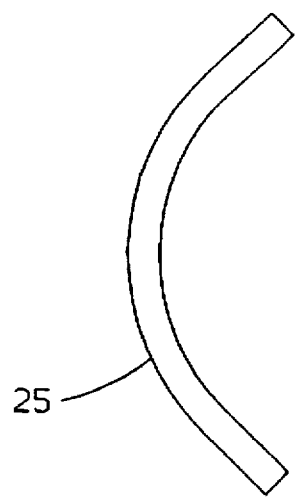
FIG. 2 shows another view of the structure in FIG. 1.

FIGS. 1 and 2 illustrate an example composite soft magnetic structure according to this invention. The structure shown is used as a substitute for a steel lamination stack in the rotor of a synchronous reluctance motor. As can be seen, the structure is U-shaped and, when assembled into a synchronous reluctance motor rotor, a plurality of similar U-shaped structures having successively increasing sizes are stacked and mounted in the rotor described below.

When used in a synchronous reluctance motor rotor, the structure 25 ideally carries magnetic fields in the direction of arrows 12. In many soft magnetic structures, such as structure 25 for use in the rotor of synchronous reluctance motors, it is desirable to have a primary direction of magnetic flux carrying while minimizing the flux carrying capacity in a second direction orthogonal to the primary direction. Flux travelling in directions other than the primary direction can decrease the efficiency of the machine.

According to this invention, the soft magnetic structure 25 is formed of a composite soft magnetic material having gains aligned in the primary direction 12, which increases the desirable flux carrying capacity of the structure parallel to the primary direction 12. Aligning the grains in the primary direction 12 also decreases the flux carrying capacity of the structure parallel to any direction (such as direction 14) orthogonal to primary direction 12. The primary direction 12 is referred to as the preferred direction of magnetization, or the direct axis and the orthogonal direction 14 is referred to as the quadrature axis.

For soft magnetic structures in which it is desirable to have magnetic flux travelling primarily parallel to one direction, a measure of efficiency is the direct axis to quadrature axis reactance ratio, which is defined as the magnetic permeability of the direct axis divided by the magnetic permeability of the quadrature axis.

Efficiency of a soft magnetic structure may be understood as follows. Soft magnetic structures carry magnetic flux in response to a magnetic field in a characteristic manner. When a magnetic field is introduced to the soft magnetic structure, the flux Bs carried through the structure increases with the increasing intensity of the magnetic field until flux Bs reaches a flux saturation level Bronx. When the magnetic flux through the structure reaches Bmax, increases in the applied magnetic field have little effect on the flux Bs through the structure. Thus, the flux capacity of a soft magnetic structure is substantially limited to a value Bmax. The total magnetic flux vector through a soft magnetic material may be defined as Bs=Bx+By+Bz, where, for purposes of this example, Bx represents flux travelling in the preferred direction parallel to the direct axis, and By and Bz represent flux travelling in secondary directions, orthogonal to the direct axis, both components defining the quadrature axis.

The direct axis to quadrature axis reactance ratio is defined as Bx/(By+Bz). As flux components in either the By or Bz direction increase, the reactance ratio decreases and the amount of flux carried in the preferred direction may decrease because Bs is limited, for practical purposes, to Bmax. By limiting the By and Bz flux components, the power capacity of a machine with the soft magnetic structure is increased because the soft magnetic structure has increased capacity in the Bx direction, parallel to the preferred axis.

Also, soft magnetic materials exhibit a directional behavior. For example, in iron, each grain has a higher magnetic permeability in certain directions than in other directions. Since magnetic fields are known to take the path of least resistance, each grain of iron can alter the path of the magnetic field through that grain, directing the field through the direction of high permeability. In prior art composite structures, grain alignment of the soft magnetic material is random, resulting in some of the iron grains sending portions of the magnetic field in quadrature axis directions. Thus, if the magnetic field applied to the structure equals Bin, and Bin through the structure comprises components Bin=Bx+By+Bz, the greater the magnetic field components in the By and Bz direction, the less magnetic field in the Bx direction parallel to the direct axis. Since the Bx direction is the preferred direction through which the magnetic field performs the desired task, increases in quadrature axis magnetic flux (By and Bz) detract from direct axis magnetic flux and decrease the efficiency of the machine.

Thus, according to this invention, composite soft magnetic structures are provided with high direct axis to quadrature axis reactance ratio (Bx/(By+Bz), which provides the structures according to this invention with increased performance and increased efficiency.

Figure 3:
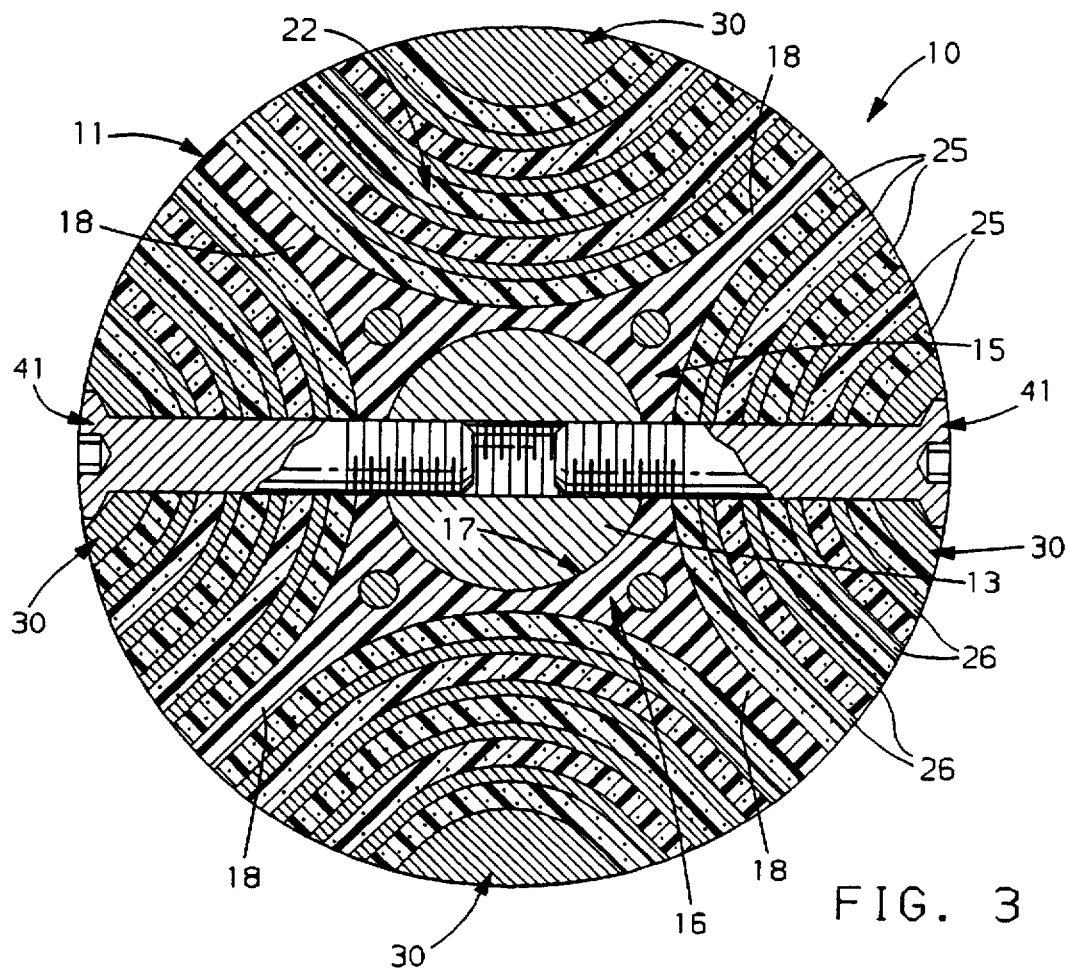
FIGS. 3 and 4 illustrate a synchronous reluctance motor rotor implementing the example structure shown in FIGS. 1 and 2.
Figure 4:
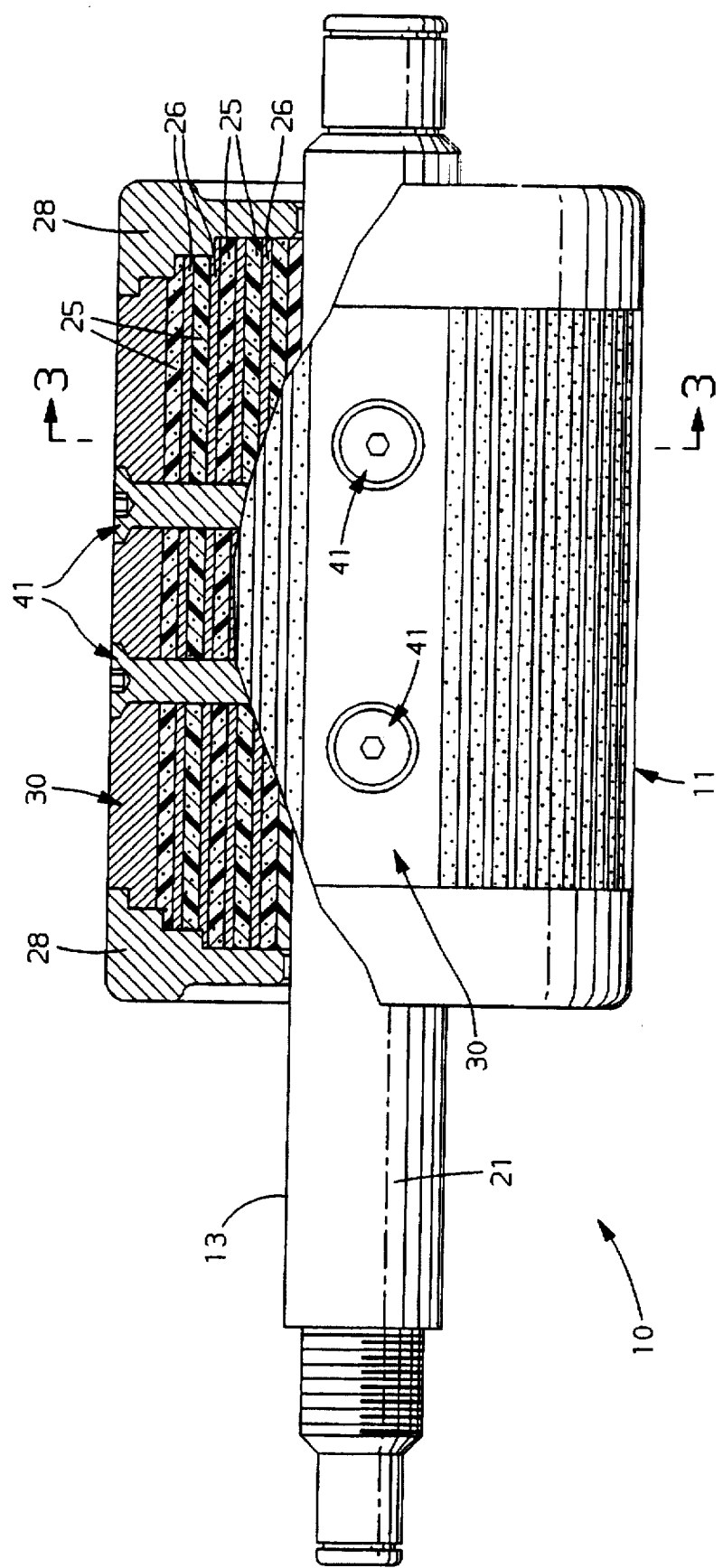

Referring to FIGS. 3 and 4, the synchronous reluctance motor rotor in which structure 25 is implemented comprises a shaft 13 fitted with a pair of end caps 28 that secure the core to the supporting shaft 13 and ensure radial integrity of the rotor 11 relative to shaft 13. The rotor 11 has a star shaped core 15. The core 15 has a body portion 16 with a central axial bore 17 extending therethrough. Four equiangularly spaced arms 18 radiate outwardly from the body portion and a passage 20 extends axially through each arm 18. The core 15 is preferably a composite member constructed of high tensile fiber glass that is laid up with the fibers oriented axially and transversely with respect to the central longitudinal axis 21 of the rotor assembly 10. Valleys 22, which extend the full axial length of core 15, are disposed between the adjacent arms 18 and each valley 22 has a substantially U-shaped cross section.

The rotor 11 includes a plurality of soft magnetic structures 25 of the type described above with reference to FIGS. 1 and 2 and described below with reference to the process of this invention. The magnetic structures 25 and non-magnetic or separator laminations 26 fill the valleys 22. The composite structures 25, according to this invention, and non-magnetic laminations 26 are alternately disposed to provide a plurality of the flux paths through the rotor 11, which cooperate with a conventional stator winding (not shown) to provide the motive or reactive forces for the machine. The outermost soft magnetic member 25 and each valley 22 has a rotor bar 30 disposed adjacent thereto. The rotor bar 30 and all of the laminations have running holes within which bolts 41 protrude. Bolts 41 extend through core 15 and are threaded to the shaft 13 to hold the rotor structure tightly together.

The nonmagnetic laminations 26 may comprise aluminum, plastic, or any nonmagnetic material. An example ratio of the thicknesses of the soft magnetic members 25 to those of the non-magnetic laminations 26 is 60% to 40%.

A more detailed description of a rotor assembly is set forth in the above identified U.S. Pat. No. 5,296,773, and will not be set forth in more detail herein as it is not germane to this invention.

Construction of soft magnetic structures, according to this invention, follows the basic steps of known construction of composite iron powder structures (see, for example, U.S. Pat. No. 4,947,065, parts of which are reproduced below) with additional improvements, according to this invention, to provide the resultant structure with grain orientation and a characteristically high direct axis to quadrature axis reactance ratio. More particularly, each structure such as the laminations are formed as a one-piece part that is molded to the size and shape necessary, such as the shape shown in FIGS. 1 and 2, and is comprised of particles of iron powder or other ferromagnetic powder that are bound together by an insulating material, typically a thermoplastic material. The iron powder in the structure, according to this invention, may be Hoeganeas 1000C iron powder. The particle size of this powder based on the U.S. standard sieve analysis is shown in the following table.

| Sieve | Percent |
| --- | --- |
| +60 | 1 |
| −60/+100 | 14 |
| −100/+325 | 70 |
| −325 | 15 |

The particle sizes of the iron powder range from about 44 to 250 microns, according to this sieve analysis. However, a very small percentage of the powder may have a particle size as small as 10 microns. The powder is about 99.7% Fe, 0.003% C, 0.0005% N, 0.006% S, and 0.004% P. The thermoplastic material may be an amorphous thermoplastic polyethermide resin, an example of which is a General Electric "ULTEM" (Registered Trademark General Electric) resin. The thermoplastic material may be replaced by a thermoset material, or another alternative material capable of performing similar functions.

To prepare powder for molding, the particles of iron powder are coated with a thin layer of thermoplastic material. One way of accomplishing this is to mix the thermoplastic material with a solvent to provide a liquid material. Another way to achieve the liquid material is with heat, or with the use of component liquid materials.

The powder is then blown by air up through a vertical tube and at the same time, the liquid material is sprayed on the powder to coat the powder. The coated powder falls outside the tube and is directed back into an inlet of the tube where it is blown up again and coated again. After a number of passes through the tube, the particles are all coated to the extent desired. The solvent evaporates or is recovered during this process. When the iron particles have been completely coated, the quantity of the coated particles are preheated and placed in a heated mold that is shaped to produce the soft magnetic structure, i.e., as shown in FIGS. 1 and 2 for a one-piece composite material lamination for a synchronous reluctance motor rotor. The material is compaction molded to the file shape and size.

During the compaction molding, thermoplastic or thermoset material is heated sufficiently to cause it to melt and bond the particles together. Also during the compaction molding, a strong magnetic field is placed across the material in the mold in the direction of the predetermined direct axis or preferred direction of magnetic flux flow. This strong magnetic field causes orientation of the iron grains in the direction of the magnetic field. Some of the powder particles may be small enough to have only one or a few significant grains. In these smaller powder particles, the particles themselves may align with the magnetic field. In larger particles, several grain domains may be present and the particles may have no overall grain orientation. For these particles, the compact molding and the magnetic field may promote a certain mount of recrystalization or grain growth, resulting domain re-alignment in the direction of the magnetic field.

The mold is allowed to cool while the magnetic field is applied so that the composite structure cools and takes a permanent form with the grain alignment parallel to the predetermined direct axis, as controlled by the application of the strong magnetic field. Example parameters are as follows: compaction mold pressure of 50 tsi (tons per square inch), heating temperature of 650 degrees Fahrenheit, magnetic flux density of 10,000 gauss or 1 tesla.

Resultant composite magnetic structures according to this invention have shown example direct axis to quadrature axis reactance ratios of 12 and generally in the range from 8 to 15. Thus this invention comprises a soft magnetic composite structure, which is a compaction molded article comprising a plurality of space-separate ferromagnetic or soft magnetic particles and a non-magnetic binding agent, i.e., the thermoplastic or thermoset, having a direct axis to quadrature axis reactance ratio of at least 8, and preferably at least 12.

In the final molded state of the soft magnetic structure, the thermoplastic material is bonded to the outer surface of each metal particle so that the particles are insulated from each other by thin layers of thermoplastic material. Further, the thermoplastic material bonds all the particles together to form the composite structure. It will be appreciated that since the particles are separated by the thermoplastic material, there are gaps formed between the particles. These gaps act like air gaps, since the thermoplastic material separating the particles has about the same permeability as air. This air-gap effect increases resistivity and, consequently, reduces eddy current loses.

It will also be appreciated that the grain or magnetic pole alignment of the iron powders is maintained and that the grain alignment increases flux carrying capacity in the direction parallel to the grain alignment and decreases flux carrying capacity in the direction perpendicular to grain alignment, thus, decreasing for non-useful flux traveling in the orthogonal direction and thus increasing the efficiency of the soft magnetic structure.

To provide output performance or power that is comparable to a structure that is formed of laminations of steel, the proportions of iron powder and thermoplastic material should fall within certain ranges. Thus, by weight, the structure should be 95 to 99.2% iron powder and 5 to 0.80% thermoplastic. Since about 1% by weight of thermoplastic equal to about 4% by volume, a core that is 99% iron powder by weight and 1% thermoplastic by weight would be in the range of approximately 96% iron powder by volume and 4% thermoplastic material by volume, depending upon the thermoplastic (or thermoset) material used. Performance of the iron particles can be altered if the iron particles have a phosphorous coating. Thus, the iron powder can be coated with a phosphate or phosphorous and this phosphorus is then over-coated with the thermoplastic material. When using phosphorus, the proportions should be, by weight, 95% to 99.2% iron powder, 0.05% to 0.5% phosphorus and 0.75% to 4.95% thermoplastic.

Advantages of the method of forming composite iron structures and the resulting composite soft magnetic structures with gain alignment, according to this invention include increased magnetic flux carrying capacity in a preferred direction, a very high ratio of direct axis to quadrature axis reactance which improves performance and efficiency of the structure. Using composite soft magnetic structures according to this invention also provides the elimination of dies and die maintenance that are required for blanking laminations, the extra machinery operations and the need for fastening a stack of laminations and material scrap losses because the part is molded.

Figure 5:
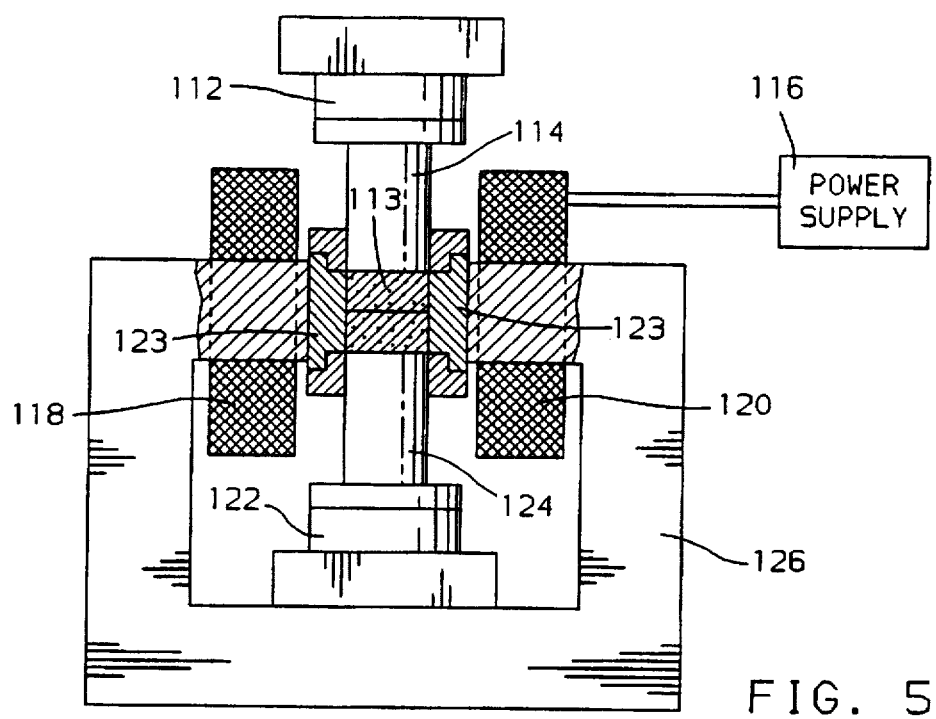
FIG. 5 illustrates a device for achieving grain orientated structures according to this invention.

Referring to FIG. 5, an apparatus for molding composite soft magnetic structures, according to this invention, includes actuators 112 and 122, pressing die mold halves 114 and 124 (also referred to as compaction punches), coils 118 and 120, yoke 126 and power supply 116. Magnetic coils 118 and 120 create a magnetic field in the preferred direction and the die 114, 124 is oriented so that the preferred direction of the composite structure is aligned with the direction of the magnetic field created by coils 118 and 120. Power supply 116 provides power to coils 118 and 120 to create the magnetic field. Yoke 126, including poles 123 of a ferrous material, guides and directs the magnetic field. Die portions 114 and 124 are constructed of a non-ferrous non-magnetic material. Actuators 112 and 122 may be hydraulic, pneumatic, cam operated mechanical, or any suitable type of actuator capable of providing the required compaction force.

Die portions 114 and 124 are first preheated to a temperature of 650 degrees Fahrenheit. Note the heating temperatures can vary greatly, depending upon the characteristics of thermoplastic or thermoset material used. For example, a thermoset material has been successfully used with heating temperatures as low as 300 degrees Fahrenheit. Lower and higher temperatures will be achieved as new materials are tried.

The die portions 114 and 124 are then placed on the actuators 112, 122 and the die 114, 124 then receive the coated powder (shown as reference 113) described above. Actuators 112 and 122 extend and provide a compaction force on the coated powder received in the die. Preferably, the force exerted by the actuators 112 and 122 is transverse, or orthogonal to, the magnetic aligning field created by coils 118, 120 and, therefore, transverse the preferred direction. However, by changing the orientation of coils 118 and 120, the compaction force can be parallel to the preferred direction.

The material is compacted at 50 tsi for 30 seconds. Good results have also been achieved at 45 and 55 tsi. While the material is compressed, a pulsating magnetic field is set up by coils 118 and 120. The power supply 116 supplies a DC pulse 0.03 seconds long or less to the coils 118 and 120 approximately once every 1 to 2 seconds to create the pulsating magnetic field, that induces grain alignment of the composite structure. When the die 114, 124 cool sufficiently, the resultant composite structure according to this invention is removed from the die. The die 114, 124 can be constructed so that the resultant structure can be ejected from the die bottom 124 or removed through disassembly of the die.

The step of preheating or otherwise heating the die need not be utilized. However, the resulting composite structure has improved mechanical properties when the die is heated or preheated.

Figure 6:
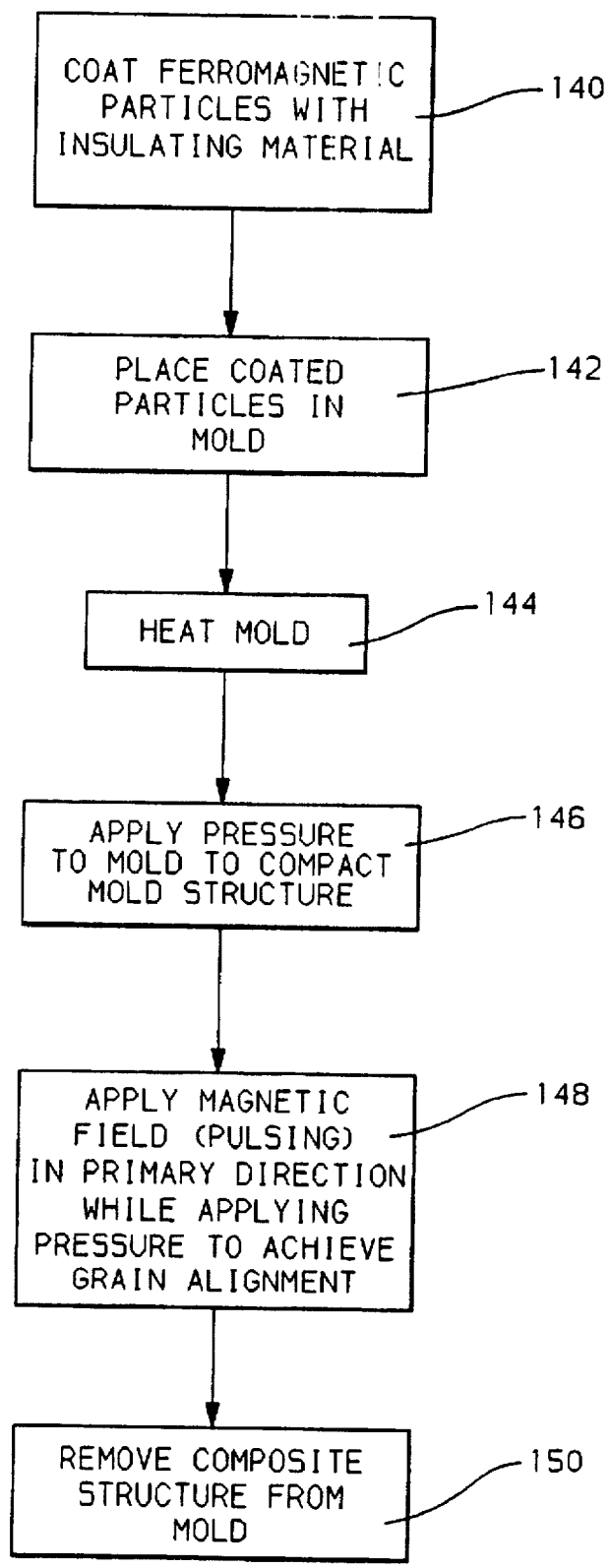
FIG. 6 illustrates the method of this invention.

The method of this invention embodied in the above description is illustrated in FIG. 6 and includes the step of (a) coating particles of a ferromagnetic material with an insulating material (block 140). Ferromagnetic material, for purposes of this invention refers to any material, in powder form, (1) that is soft magnetic, allowing magnetic domain alignment in the presence of an electric field, which alignment is substantially not permanent if the field is removed and (2) that, at least on a microscopic level, has a direct axis to quadrature axis reactance ratio greater than 1. Also, according to the method of this invention are the steps of (b) placing the coated particles in a mold (block 142), optionally, the mold is either preheated or heated after the particles are placed in the mold (block 144), (c) compact molding the coated particles into a composite structure by applying pressure to the mold (block 146), (d), while applying pressure to the mold, applying a magnetic field across the mold in a preferred direction (block 148). The preferred direction corresponds to the preferred direction of magnetic fields (the direct axis) through the resultant composite structure. The magnetic field is preferably pulsed and acts to align the grains of the ferromagnetic material through either particulate orientation or promotion of grain growth parallel to the direct axis. Preferably, the direction of applied pressure to the mold is orthogonal to the preferred direction of the magnetic field. The method of this invention also includes the step of (e) removing the composite structure from the mold (block 150), wherein the composite structure has grain alignment and a high direct axis to quadrature axis reactance ratio.

The above described example soft magnetic structure with grain alignment according to this invention is one implementation. The soft magnetic structure according to this invention may be any soft magnetic structure and may be molded to any required shape useful for inductors, motors, transistors, sensors, etc., in which a soft magnetic core is desirable. Moreover, various improvements and modifications to this invention may occur to those skilled in the art and such improvements and modifications will fall within the scope of this invention, as set forth below.

The embodiments of the invention in which an exclusive property or privilege is claimed are defined as follows:

1. A soft magnetic structure substantially comprised of a plurality of magnetic field carrying particles molded and retained in a fixed shape, bonded in that shape by an insulating binding agent;

wherein said particles have grain domain alignment substantially parallel to a preferred direction parallel to a direct axis;

wherein the structure has a direct axis to quadrature axis reactance ratio of at least 8.

2. A compaction molded article comprising a plurality of ferromagnetic particles and a non-magnetic binding agent having a direct axis to quadrature axis reactance ratio of at least 8.

3. A soft magnetic composite structure comprising soft magnetic particles and a non-magnetic binder having a direct axis to quadrature axis reactance ratio of at least 12.

4. A soft magnetic composite compaction molded article comprising a plurality of space-separate soft magnetic particles and a non-magnetic binder having a direct axis to quadrature axis reactance ratio ranging from 8 to 15.

5. A soft magnetic composite compaction molded article comprising a plurality of space-separate soft magnetic particles and a non-magnetic binder having a direct axis to quadrature axis reactance ratio ranging from 10 to 15.

* * * * *